Nov. 17, 1925.

S. B. REDFIELD 1,561,745

MAIN BEARING

Filed April 4, 1923    2 Sheets-Sheet 1

Inventor
Snowden B. Redfield.
By His Attorney
Herbert G. Ogden

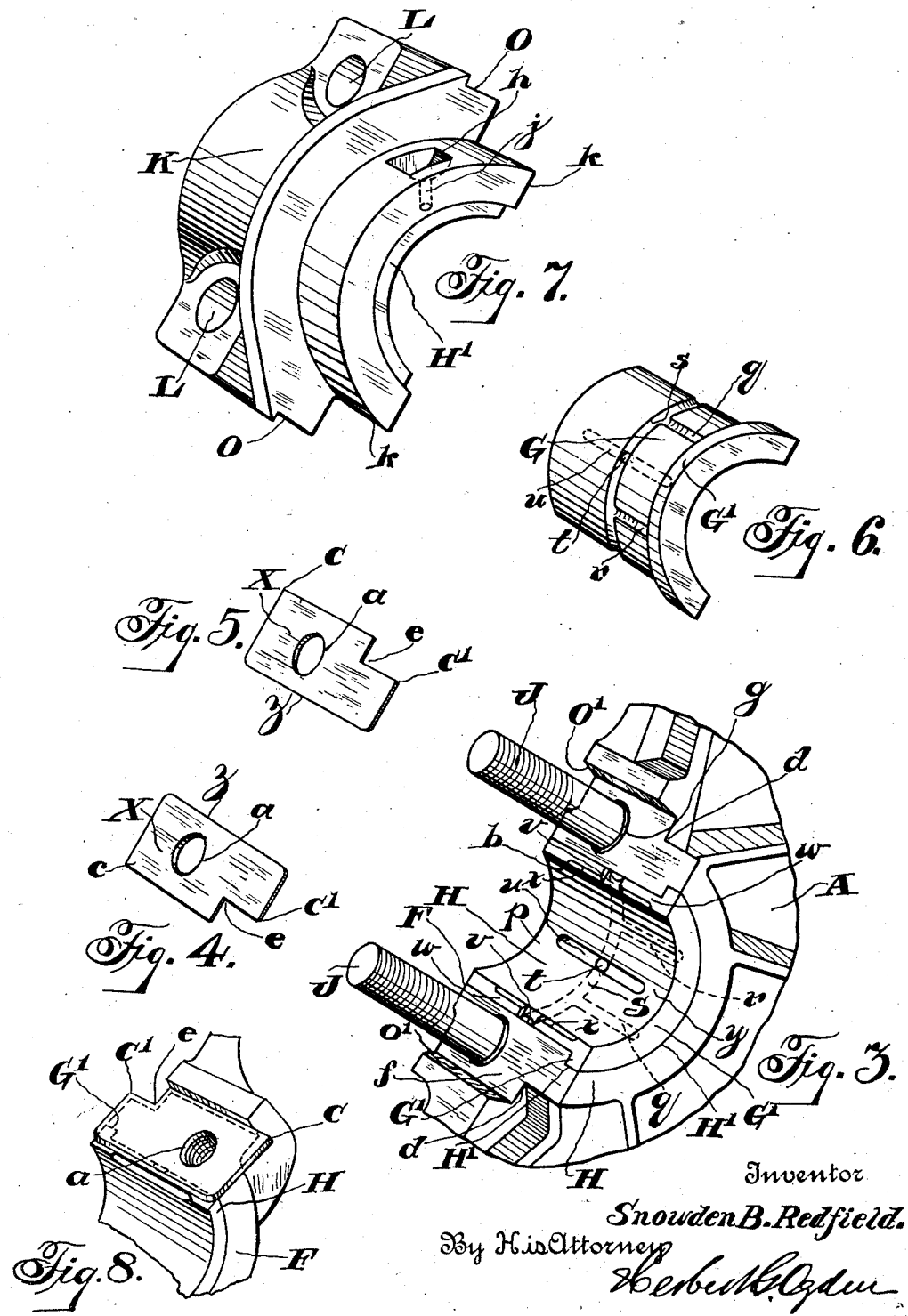

Patented Nov. 17, 1925.

1,561,745

UNITED STATES PATENT OFFICE.

SNOWDEN B. REDFIELD, OF EASTON, PENNSYLVANIA, ASSIGNOR TO INGERSOLL-RAND COMPANY, OF JERSEY CITY, NEW JERSEY, A CORPORATION OF NEW JERSEY.

MAIN BEARING.

Application filed April 4, 1923. Serial No. 629,767.

*To all whom it may concern:*

Be it known that I, SNOWDEN B. REDFIELD, a citizen of the United States, and a resident of Easton, county of Northampton, State of Pennsylvania, have invented certain Main Bearings, of which the following is a specification accompanied by drawings.

This invention relates to bearings for engines and more particularly to main bearings for reciprocating air compressors but which is also adaptable for gas, steam or other engines.

The primary object of the invention is to secure a simple bearing which will effectively withstand the vertical forces set up due to the weights of the rotating parts, the horizonal forces due to the work of the compressor or other engine and the inertia of the reciprocatory masses, and which will also possess features of adjustability in the direction of the wear resulting from the combined action of these forces; and which will, in addition, be very rigid in the direction of the working force so that there will be little, if any, tendency of the working force to introduce flexure or deflection into the frame or to distort the bearing surfaces.

A further object of the invention is to construct the bearing in two parts which are set at an angle to the vertical and are held tightly and rigidly in place and yet may be easily removed or loosened when desired.

A still further object is to continuously and automatically lubricate the bearings at all speeds by causing the lubricant to be introduced at a point located at an angle to the plane of the bearing, lubricant flowing around the outside of the bearing shells and entering the inner bearing surface at a plurality of points so that the lubricant is distributed over the full width and around the complete circumference of the bearing.

A still further object is to secure adjustment of the bearing in case of wear or in case of overheating by means of readily removable shims which are effectively retained against dislocation and which also act to prevent turning or rotation of the bearings themselves within the bed casting.

A still further object is to uniformly construct the four half bearings ordinarily used in an air compressor or similar engine so that each half will be identical and interchangeable with any of the others, thus reducing the cost of manufacture as well as the number of parts necessary to be carried in stock by the user or dealer. Still further objects will later appear and to all these ends my invention consists in the features of construction and operation set forth in the following specification and illustrated in the accompanying drawings, in which—

Figure 3 is a perspective view of a portion of the inside of the main frame showing the lower half of the bearing, the crank shaft being removed;

Figures 4 and 5 are perspective views of a pair of shims adapted to be placed in position over the bearing studs seen in Figure 3;

Figure 6 is a perspective view of the upper bearing shell;

Figure 7 is a perspective view of the bearing cap, and

Figure 8 is a perspective view of a portion of the outside of the main frame, showing one of the shims in place.

Figure 1:
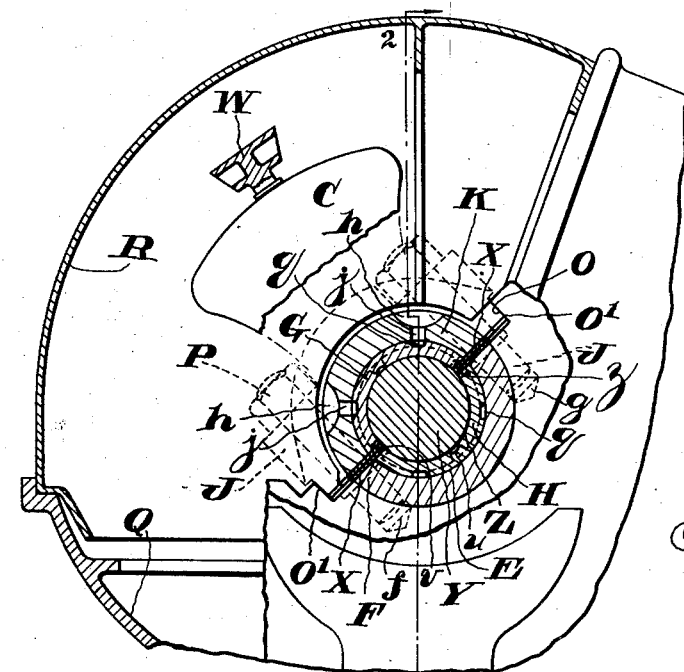
Figure 1 is a longitudinal section view through the crank end of an air compressor including the bearing, taken on the line 1—1 of Figure 2 looking in the direction of the arrows.
Figure 2:
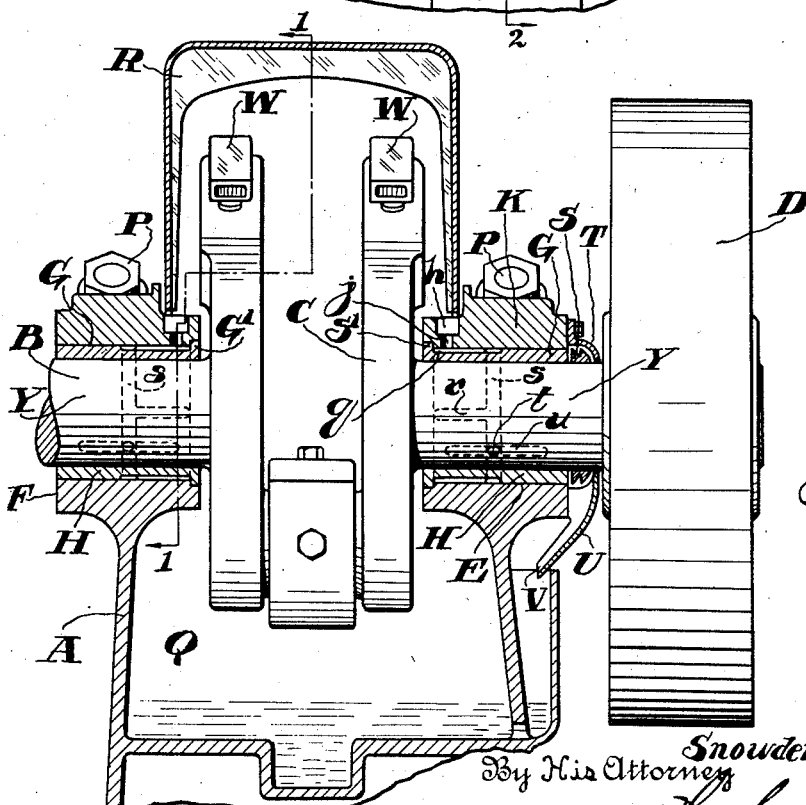
Figure 2 is a vertical section through the crank end of the compressor taken on the line 2—2 of Figure 1, looking in the direction of the arrows.

Referring further to the drawings, I have illustrated a portion of the main frame or bed casting A at the crank end of the air compressor. The crank shaft is represented by B, the cranks by C, and the flywheel by D. The frame A is bored at E to form the bearing seats or pads F and to receive the semi-cyclindrical bearing shells which in this instance are identical with each other, the upper bearing shells at each end of the crank shaft being designated by G and the lower bearing shells by H. The shells G and H are provided with semi-annular lips or flanges G' adapted to fit loosely in semi-annular seats H' in the inner ends of the upper and lower bearing seats to rigidly secure the shells against side thrust. The openings E are formed at an angle to the vertical for certain reasons which are well known and others which will be more fully described later. This angle, in the present instance, is substantially 45°. One or more bearing studs J are provided at each end of the crank shaft and on opposite sides of the openings E and a cap K having openings L which are adapted to be aligned with the studs J is fitted over the opening E, the parallel sides O of the cap K fitting snugly between the side walls O' of the frame opening E. The studs J are threaded at both ends and the end which screws into the frame is countersunk so that the threads are entirely below the surface of the metal of the frame. The caps K are secured by nuts P threaded on to the studs J. The crank case Q is enclosed by a removable cover R. Each end of the crank shaft B is equipped with an oiler collar S and a two-part oil guard including a substantially semi-circular upper part T and a lower part U is adapted to surround the shaft end so that oil running out from the outer ends of the bearings is caught and the overflow is directed into the interior of the crank case by the spout V. The cranks C are provided with oil scoops W which are adapted to dip into the oil reservoir or oil in the crank case on each revolution to supply lubricant to the crank bearings.

Shims X are preferably provided between the main bearing shells in order to retain the desired clearance between the journals Y and the inner bearing surface Z of the shells. These shims X are substantially rectangular, flat metallic pieces having holes a so that they may be fitted over the studs. They are interchangeable side-for-side of each bearing and end-for-end of the crank shaft. The inner side edge of each shim projects slightly over the end surface of the side b of the bearing shell, thus preventing the shell from turning within the frame bearing, and the outer edge of each shim fits against the side walls O' of the frame A with sufficient tightness to prevent any turning or dislocation whereby the shim might touch the shaft. Some of the shims may, if desired, be of greater thickness than others. A number of thin shims and preferably two thick shims or plates are used on each stud, the thin shims being used for adjustment and the thick shims to prevent turning of the shells, though one thick shim has been found to be sufficient for this purpose, so that in certain cases when necessary one of the thick shims and a number of the thin shims may be conveniently removed from each stud to obtain the proper adjustment.

One advantage resulting from the use of shims looped over the studs is that while the caps are generally screwed down tightly an operator will in many cases find it advisable to loosen a main bearing cap slightly if the bearing runs excessively hot, and in such cases the upper shims will not change their relative position or drop down on the shaft.

As shown at c the corner of the shim in each case is preferably adapted to be exposed slightly beyond one end of the bearing seat F, preferably the outer end, as shown in Figure 3, so that the operator may more readily grasp the shim to remove it. The inner ends of the bearing seats F are cut away as shown at d so that the projecting corner c' of the shim will also be accessible from the inside for easy removal. The threaded holes f and g for the studs are counterbored in the frame bearing F so that the threads will not be engaged by the shims and in order that a perfect fit may be obtained. The inner ends of the cap K are in the present instance provided with an oil recess h having an aperture j which is adapted to communicate with the frame bearing seats F outside of the bearing shells H. The recess h having the aperture j is disposed substantially vertically when the cap K is in place and is used for conveying lubricant to the main bearing.

The bearing shells G and H are constructed exactly alike and are provided with suitable grooves for receiving the lubricant from the aperture j and conveying it to the interior surface of the bearing shells in which the journals Y rotate. The lubricant-conveying grooves include an outer longitudinal groove q in the exterior surface of the gearing shell and disposed toward one side thereof. This groove q is so positioned that when the upper shell G is in place in the cap the groove of the shell G is in communication with the vertically aligned aperture j. A second longitudinal groove r is provided at the opposite side of the bearing shell G and this goove r is used instead of the groove q when the shell is fitted within the cap at the opposite end of the crank shaft. The arrangement of the grooves is such that one of the grooves q or r will be aligned with the aperture j which is vertical to the axis of the crank shaft, regardless of whether the shell is placed in the cap at one side or the other of the crank shaft, so that an entrance is always provided but no exit.

The grooves q and r extend from the inside of the lips G' to a point here shown as substantially centrally of the length of the shell where they join a circumferential cross groove s traversing the peripheral surface of the shell from one side to the other. The cross groove s may, however, be located at any point in the length of the shells.

A hole t leads from the cross groove s at a point substantially at the center of each shell, this hole communicating with a central inner longitudinal groove u in the inner bearing surface of the shells. The inner groove u is preferably somewhat longer than the outer grooves and extends longitudinally toward the ends of the shell preferably substantially the same distance from each side of the central hole t, and terminates at a point short of the outer and inner ends of the shell.

The lower shell H is the exact counterpart of the upper shell G in respect to the provision and location of the outer, inner and cross grooves, so that when the upper and lower shells G and H are placed together the cross grooves of both shells form a continuous circumferential groove adapted to communicate with the inner longitudinal grooves of the shells through the holes $t$. Side apertures $v$ similar to the holes $t$ and communicating with the cross groove $s$ are provided in the meeting surfaces $w$ of the edges of the shells and the inner edges of the opposing surfaces $w$ are chamfered or beveled as shown at $x$, thus forming inner longitudinal grooves, one at each side, substantially the same as the inner grooves $u$. The inner bearing surface $y$ thus has four inner longitudinal grooves communicating through four radial openings with the cross groove, which in turn communicates with an outer longitudinal groove, this outer longitudinal groove being in communication with a source of lubricant supply through the aperture $j$. The oil or other lubricant flows from the recess $h$ to the four inner longitudinal grooves, from whence it is distributed over the entire surface of the bearing at four diametrically opposite points and thoroughly lubricates the journal.

The shims which project over the surfaces $w$ at the meeting sides of the shells extend slightly into the beveled longitudinal grooves $x$ but are cut back from the bearing surface $y$ to prevent contact with the rotating member as shown at $z$. The lubricant is thus free to pass by the edges of the shims from one shell to the other, but the projecting shim edges assist to spread the lubricant throughout the full length of grooves $x$.

The complete circulation of lubricant afforded by the present construction reduces wear to the minimum so that the bearing shells can be run for a long time without requiring adjustment and it is seldom necessary to replace the shells with a new set. The shims permit of continuous adjustment and further adjustments can be made by transposing the upper and lower shells or transferring the shells from one side to the other, any one shell being adapted to fit in all four locations.

I claim:

1. A main bearing comprising a main frame having a bearing seat, the opening of said seat being at an angle to the vertical, a cap covering said opening, means for securing the cap in place and a bearing in said seat, said bearing including two symmetrical bearing shells, and lubricating means for the inner bearing surface of said shells, said means including a lubricant recess in said cap; outer longitudinal grooves on said shells, communicating circumferential cross grooves on said shells, said cross grooves communicating with the inner bearing surface, and inner longitudinal grooves adapted to distribute the lubricant throughout the bearing surfaces.

2. A main bearing comprising a main frame having a bearing seat, the opening of said seat being at an angle to the vertical, a cap for said opening, means for securing the cap in place and a bearing in said seat, said bearing including two identical semi-cylindrical bearing shells, a lubricant recess in said cap, said shells having outer and inner grooves leading from the lubricant recess to the bearing surface, said grooves including an outer groove, a communicating circumferential cross groove, said cross groove communicating with the inner bearing surface at a plurality of points, and a plurality of inner grooves adapted to distribute the lubricant throughout the bearing surface.

3. A main bearing comprising a main frame having a bearing seat, an opening for said seat, a cap covering said opening, means for securing the cap in place and a bearing in said seat, said bearing including two symmetrical bearing shells and lubricating means for the inner bearing surface of said shells, said means including a lubricant recess in said cap, outer longitudinal groove on said shells, communicating circumferential cross grooves on said shells, said cross grooves communicating with the inner bearing surface, and inner longitudinal grooves adapted to distribute the lubricant throughout the bearing surfaces.

4. A bearing comprising a main frame having a bearing seat, an opening for said seat, and a cap for said opening, means for securing the cap in place and a bearing in said seat, said bearing including two identical semi-cylindrical bearing shells, a lubricant recess in said cap, said shells having outer and inner grooves leading from the lubricant recess to the bearing surface, said grooves including an outer groove, a communicating circumferential cross groove, said cross groove communicating with the inner bearing surface at a plurality of points, and a plurality of inner grooves adapted to distribute the lubricant throughout the bearing surface.

In testimony whereof I have signed this specification.

SNOWDEN B. REDFIELD.